United States Patent Office 3,403,605
Patented Oct. 1, 1968

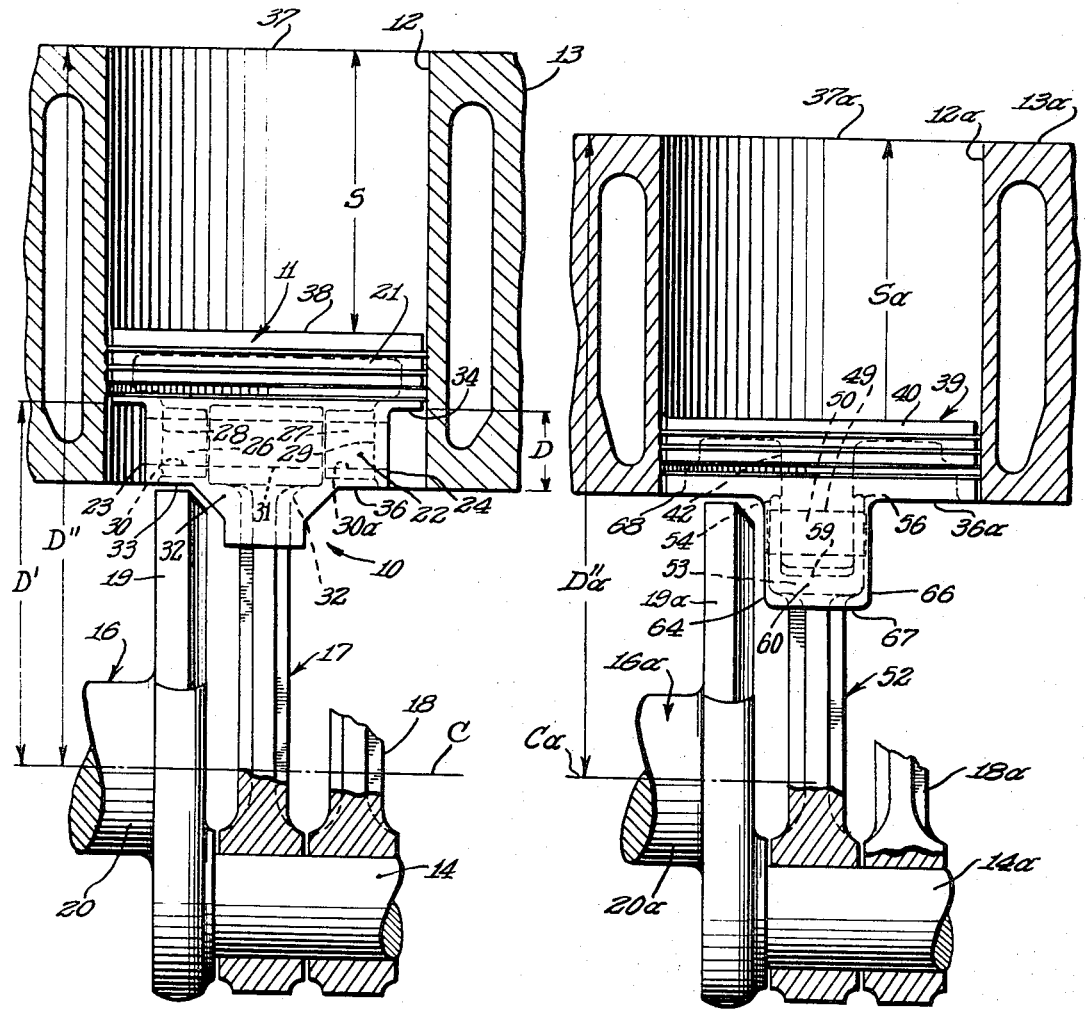

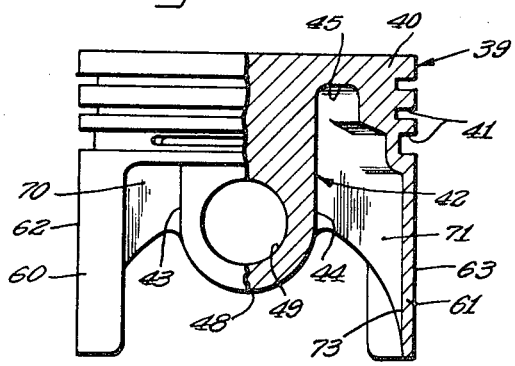
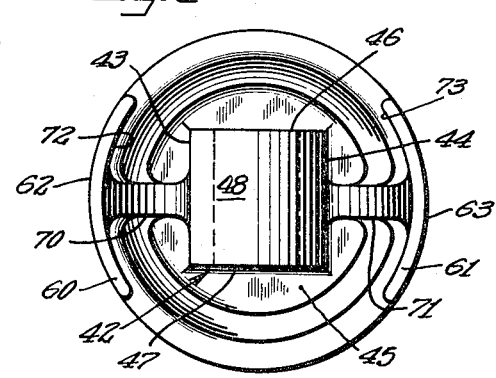
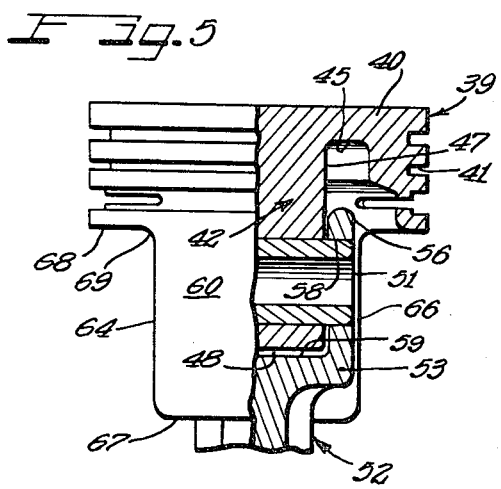
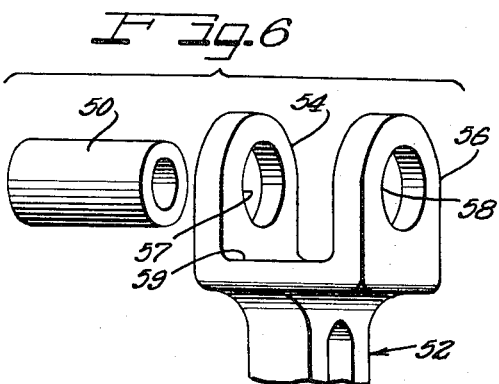
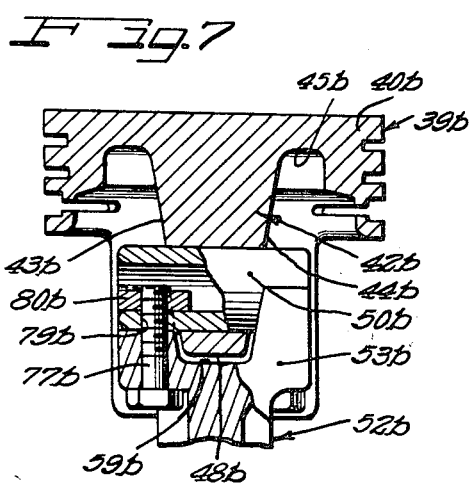
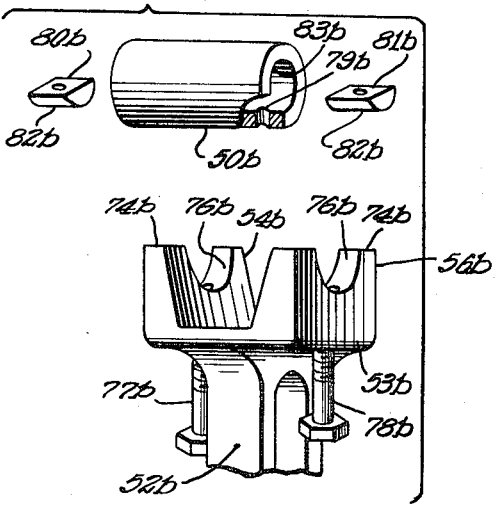

3,403,605
SINGLE PIN BOSS PISTON
Frederick H. Schmidt, Willowick, Ohio, assignor to
TRW Inc., Cleveland, Ohio, a corporation of Ohio
Filed May 6, 1966, Ser. No. 548,091
4 Claims. (Cl. 92—187)

ABSTRACT OF THE DISCLOSURE

A piston-connecting rod assembly for counterweight equipped crankshafts wherein the piston comprises a single pin boss depending from a central portion of the lower surface of the piston head and the connecting rod comprises a bifurcated connecting end straddling the pin boss. The pin boss is apertured to receive a piston pin, the ends of which project outwardly beyond the pin boss and are fixedly connected to the forked members of the rod. Sufficient space is provided under the piston head to receive the counterweight on the crankshaft in overlapping relation to the pin boss thereby reducing the required height between the top of the block in which the piston operates and the centerline of the crankshaft.

This invention relates generally to a piston assembly for internal combustion engines and more particularly to a piston-connecting rod arrangement wherein the piston comprises a single pin boss depending from a central portion of the underhead surface of the piston head and the connecting rod comprises a bifurcated connecting end straddling the pin boss. The pin boss and forked members of the connecting rod are apertured to receive a piston pin, the ends of which project outwardly beyond the pin boss and are fixedly connected to the forked members of the rod.

Since the single pin boss depends downwardly from the underhead surface of the piston head, in contrast to prior art arrangements wherein a pair of diametrically opposed pin bosses are formed adjacent the periphery of the piston or on the inner face of the piston skirt, the skirt can be eliminated except for a pair of narrow slipper surfaces at the thrust locations on the piston. The elimination of a large portion of the piston skirt, particularly along the sides facing the ends of the piston pin, as well as the twin pin bosses, enables the piston head to approach much more closely the adjacent counterbalance weights normally employed on the rotating crankshaft of an engine and thus more closely approach the center line of the crankshaft. As a result the top of the engine block to crankshaft center line dimension as well as the engine weight can be reduced and the engine made more compact.

The piston pin and connecting rod can also be made shorter as a result of this invention, and the attendant reduction in weight of these components reduces the reciprocating weight and inertia forces, thus making higher engine speeds possible.

In addition the single pin boss construction provides a piston structure which is more durable than the double pin boss construction by substantially reducing the stresses that occur where the pin boss joins the piston head.

It is, therefore, an object of the present invention to provide an improved piston assembly for an internal combustion engine whereby the top of the engine block to crankshaft center line dimension as well as the engine weight can be reduced and the engine speed can be increased.

It is another object of the invention to provide a piston having a single pin boss depending downwardly from the underhead surface of the piston head whereby a large portion of the piston skirt can be eliminated.

Another object of the invention is to provide a piston having a skirt which comprises merely a pair of narrow slippers at the thrust locations of the piston whereby the head of the piston can move downwardly into more proximate relation to the counterbalance weights on the crankshaft.

Another object of the invention is to provide a piston structure which is more durable and which has a longer useful life.

Another object is to reduce the weight of the piston and connecting rod and thereby to reduce the reciprocating weight and inertia forces of these components.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

On the drawings:

FIGURE 1 is a fragmentary vertical cross-sectional view of a conventional piston-connecting rod arrangement of an internal combustion engine with certain parts or portions thereof shown in elevation;

FIGURE 2 is similar to FIGURE 1 but substitutes an improved piston-connecting rod arrangement constructed in accordance with the principles of the present invention for the conventional arrangement shown in FIGURE 1;

FIGURE 3 is a side elevational view of the improved piston shown in FIGURE 2 with portions thereof shown in section;

FIGURE 4 is a bottom plan view of the piston of FIGURE 2;

FIGURE 5 is similar to FIGURE 3 but shows the piston rotated 90° and includes a pin mounted in the pin boss and the connecting end of a connecting rod constructed in accordance with the present invention mounted thereon;

FIGURE 6 is an exploded view of the piston pin and the connecting end of the rod shown in FIGURE 5;

FIGURE 7 is a vertical sectional view showing another embodiment of the present invention; and FIGURE 8 is an exploded view of the piston pin, connecting end of the rod and fastening means of the embodiment shown in FIGURE 7.

As shown on the drawings:

Although the principles of the present invention are of utility in any piston assembly, an important application is made to piston assemblies for use in an internal combustion engine and the illustrative embodiment of an engine herein shown comprises a gasoline engine of the V type.

In FIGURE 1 reference numeral 10 indicates generally a prior art piston assembly which comprises a piston 11 carried for reciprocating movement within a cylinder 12 of an internal combustion engine block 13. The piston 11 is connected to a rod journal 14 of a crankshaft 16 by means of a connecting rod 17 which is mounted on the journal 14 adjacent another rod 18 connected to the piston of another cylinder disposed at an angle to cylinder 12 in the manner of a V type engine.

A vertically extending crankshaft counterbalance weight 19 interconnects the rod journal 14 and a main journal 20, a center line indicated at C of which is coaxial with the axis of rotation of the crankshaft 16. Another counterbalance weight is disposed at the opposite end of the rod journal 14 for interconnecting the rod journal with another main journal.

The piston 11 is more particularly characterized as comprising a piston head 21 from which depends a skirt 22 extending circumferentially around the piston 11 except for two short sides thereof which are flattened as at 23 and 24.

A pair of piston pin bosses 26 and 27 are formed respectively on inner walls 28 and 29 of the two flat sides 23 and 24. The bosses are centrally apertured as at 30 and 30a to receive a piston pin 31 which extends between the bosses. An enlarged connecting end 32 of the rod 17 extends upwardly between the bosses 26 and 27 and is also apertured to receive the pin 31. In order to accommodate the radial thrust forces inherently developed in the operation of the engine 13 a pair of diametrically opposed slipper surfaces as at 32 are formed on the skirt 22 and project downwardly below the pin 31 and the bosses 26 and 27.

As a result of the formation of the pair of spaced bosses 26 and 27 on the flat inner walls 28 and 29 of the skirt 22 the lowermost position of the piston head 21 (that is, the position of the piston head at bottom dead center) with respect to the center line C of the crankshaft 16 is limited by the lowermost possible position of a bottom wall 33 of the boss 26, since the counterbalance weight 19 is disposed directly below and in the path of travel of the boss 26. Thus, in the lowermost position of the piston head 21 (as indicated in FIGURE 1) a bottom wall 34 thereof is at a distance D from a bottom wall 36 of the cylinder 12. The minimum distance between the center line C of the crankshaft 16 and the bottom wall 34 of the piston head 21 is indicated at D' and the minimum distance between the center line C and a top wall 37 of the engine block 13 is indicated at D''. The stroke of the piston 11, that is, the distance that a top surface 38 of the piston head 21 travels from a top dead center position, coincident with the top wall 37 of the engine block 13, to the bottom dead center position thereof shown in FIGURE 1 is indicated by the reference character S.

An important advantage of the piston assembly of the present invention is that the distance indicated at D'' in FIGURE 1 can be substantially reduced, thereby reducing the overall height of the engine block 13. In addition the weight of the piston and connecting rod can also be reduced, thereby not only reducing the reciprocating weight and inertia forces of these components to increase engine speed but also reducing the overall weight of the engine.

An illustrative embodiment of the improved piston-connecting rod assembly of the present invention is shown in FIGURES 3–6. A piston 39 shown therein is constructed in accordance with the principles of the present invention and is particularly characterized as comprising a piston head 40 having formed in the periphery thereof a series of spaced grooves 41 for receiving a corresponding series of piston rings. In contrast to the prior art embodiment shown in FIGURE 1, the piston 39 of the present invention has only a single piston pin boss rather than two spaced bosses, and the single boss is situated centrally with respect to the piston 39.

Thus a pin boss 42 is formed integrally with and depends from a central portion of an underhead surface 43 of the piston head 40. The boss 42 is more particularly characterized as comprising a pair of spaced parallel vertical side walls 43 and 44, a pair of spaced parallel vertical end walls 46 and 47 which extend transversely to the side walls 43 and 44 and a semi-circular bottom wall 48 which interconnects the side walls 43 and 44.

The boss 42 is cylindrically apertured as at 49, the longitudinal axis of which aperture extends parallel to the side walls 43 and 44. The aperture 49 receives a complementary tubularly shaped elongated piston pin 50 which comprises a pair of end portions as at 51 which project outwardly beyond the end walls 46 and 47 of the boss 42 in the assembled position of the pin.

An associated connecting rod 52 is characterized as comprising a bifurcated connecting end 53 having a pair of upstanding forked members 54 and 56 which straddle the end walls 46 and 47 of the boss 42 and which have formed respectively therein registered apertures 57 and 58 which receive the projecting end portions 51, 51 of the tubular piston pin 50. A transverse flange 59 joins the lower ends of the forked members 54 and 56 and is disposed in spaced relation to the bottom wall 48 of the boss 42 in the assembled position of the connecting rod 52.

In the embodiment illustrated in FIGURES 3–6 the forked members 54 and 56 of the rod 52 are connected in fixed assembly to the projecting end portions 51, 51 of the pin 50 by means of a press fit connection, whereas the pin 50 is received in the aperture 49 of the boss 42 in a free fit relation whereby the rod 52 and the pin 50 are rotatable with respect to the pin boss 42.

In order to accommodate the thrust forces inherently imposed by the piston 39 in a radial direction on its corresponding cylinder wall, a pair of diametrically opposed narrow skirts 60 and 61 extend vertically downwardly from the piston head 40 and comprise, respectively, peripheral slipper surfaces 62 and 63 which are machined to a diameter substantially equal to the diameter of the piston head 40. As shown in FIGURE 5, the skirts 60 and 61 extend respectively in a direction transverse to the longitudinal axis of the piston 39 a distance substantially equal to the transverse dimension of the pin boss 42, that is, substantially equal to the distance between the end walls 46 and 47 of the boss 42.

More particularly, the skirts 60 and 61 each comprise a pair of spaced parallel vertical side walls 64 and 66 which extend vertically downwardly below the piston pin 50 and the bottom wall 48 of the pin boss 42. A horizontal bottom wall 67 interconnects the side walls 64 and 66 which, in turn are joined to a bottom wall 68 of the piston head 40 by means of an arcuate transition member 69.

The illustrative embodiment of the present invention shown in FIGURES 3–6 is shown assembled in an engine block 13 in FIGURE 2, in which figure parts corresponding to those shown in FIGURES 3–6 are designated by similar reference characters with the suffix a added.

As a result of the centrally depending single pin boss arrangement of the invention in which the boss 42 is situated directly above the connecting rod 42 rather than in vertical alignment with the counterbalance weight 19 the bottom wall 68 of the piston head 40 is able to move downwardly to the bottom wall 36 of the cylinder 12 at the bottom dead center position of the piston 39 as shown in FIGURE 2.

Assuming that the vertical thickness of the piston head 40 is the same as that of the piston head 21 of the prior art arrangement shown in FIGURE 1 and assuming that the stroke $S_a$ is equal to the stroke S of FIGURE 1, it will be readily appreciated that the distance between the top wall 37 of the engine block 13 to the center line C of the crankshaft 16 indicated at reference character D″$_a$ in FIGURE 2 is substantially less than the corresponding distance indicated at reference character D″ in FIGURE 1. Thus for the same stroke of the piston, the overall height of the engine block 13$_a$ is substantially less than the overall height of engine block 13.

It should also be noted that as a result of the single pin boss arrangement of the present invention the length of connecting rod 42 of FIGURE 2 is correspondingly less than the length of the connecting rod 17 of FIGURE 1. Also, since less material is required in the construction of the single boss piston 39 as opposed to the prior art piston 11 as the result of having only a single pin boss rather than two bosses and as the further result of the elimination of a substantial portion of the piston skirts, the total weight of the piston 39 and the connecting rod 42 is substantially less than the weight of the piston 11 and the connecting rod 17. Thus the reciprocating weight and inertia forces of these components are decreased to increase engine speed. In addition the overall weight of the engine block is decreased as a result of a reduction in weight of the piston and connecting rod for each cylinder of the engine and as a further result of the decrease in height from the bottom to the top walls of the cylinders for a given stroke of the pistons.

Referring again to FIGURES 3 and 4, the narrow skirts 60 and 61 are rigidified by means of a pair of web portions 70 and 71 which interconnect inner walls 72 and 73 of the skirts 60 and 61 with the side walls 43 and 44 of the boss 42 and the underhead surface 43 of the piston head 40.

Another embodiment of the invention is illustrated in FIGURES 7 and 8 wherein parts corresponding to those shown in FIGURES 3–6 are designated by similar reference characters with the suffix b added. In this embodiment the forked members of the bifurcated connecting rod are received in fixed assembly to the pin boss by means of threaded fastening devices rather than the press fit connection of the embodiment of FIGURES 3–6.

Thus the piston 39$_b$ comprises a single pin boss 42$_b$ which extends downwardly from a central portion of the underhead surface 43$_b$ of the piston head 40$_b$. In this embodiment the side walls 43$_b$ and 44$_b$ of the boss 42$_b$ are tapered and are joined together at the bottom ends thereof by a horizontal bottom wall 48$_b$.

The forked members 54$_b$ and 56$_b$ of the connecting end 53$_b$ of the rod 52$_b$ each comprise a horizontal top wall as at 74$_b$ in which is formed an upwardly opening semi-circular recess 76$_b$ for receiving the bottom portions of the piston pin 50$_b$ in abutting engagement. The rod 52$_b$ is fixedly and co-rotatably connected to the pin 50$_b$ by means of a pair of threaded fastening devices which, in the illustrated embodiment, comprise a pair of threaded bolts 77$_b$ and 78$_b$ which extend respectively upwardly through the forked members 54$_b$ and 56$_b$ and into their respective recesses 76$_b$ and through registered openings as at 79$_b$ formed in the bottom portion of the piston pin 50$_b$. A pair of complementarily threaded nuts 80$_b$ and 81$_b$ are disposed inside of the pin 50$_b$ in threaded relation with the threaded ends of the bolts 77$_b$ and 78$_b$ and it will be noted that surfaces 82$_b$ of the nuts 80$_b$ and 81$_b$ which engage an interior wall 83$_b$ of the pin 50$_b$ and which are shaped complementarily thereto.

It will thus be appreciated that in the embodiment of FIGURES 3–6 as well as the embodiment of FIGURES 7–8 the connecting rod is fixedly secured to the piston pin for movement therewith relative to the pin boss. However, by suitable modifications the piston pins could be held in fixed assembly with respect to the pin bosses and the connecting rods could be connected to the piston pins in a manner to provide relative rotation therebetween.

Although minor modifications might be suggested by those versed in the art, it should be understood that I wish to embody within the scope of the patent warranted hereon all such modifications as reasonably come within the scope of my contribution to the art.

I claim as my invention:

1. In an internal combustion engine including a cylinder and a rotatable crankshaft having spaced-apart counterbalance weights mounted thereon, the improvement of a piston-connecting rod-crankshaft assembly comprising, a piston reciprocally carried in said cylinder and including a piston head, means depending from the crankshaft side of said piston head forming a pin boss, a pair of narrow skirts depending from diametrically opposed peripheral portions of said piston head in spaced relation from the sides of the pin boss for providing slipper surfaces at the thrust locations of the piston, means forming a piston pin receiving aperture in said boss, a pin journalled in said aperture and projecting outwardly of said boss at the ends thereof, and a connecting rod having one end journalled to said crankshaft adjacent one of said weights and having at an opposite bifurcated connecting end thereof means forming a pair of forked members straddling the boss and connected to the projecting ends of said pin, said boss, said pin, said bifurcated end of the connecting rod and said skirts being disposed on said piston head so that the reciprocal paths of travel thereof and said adjacent counterbalance weight are axially offset sufficiently with respect to the axis of rotation of the crankshaft to accommodate lateral overlapping of said weight therewith and said weight having a travel path bringing it close to the piston head in overlapped relation with the pin boss.

2. The structure as defined in claim 1, wherein said skirts extend respectively in a direction transverse to the longitudinal axis of the piston head a distance substantially equal to the transverse dimension of said pin boss and the counterweight operates under the piston head along the side edges of the skirts.

3. A piston assembly for reciprocation in a cylinder of the internal combustion engine comprising, a piston including a piston head, means depending from one side of said piston head forming a pin boss, means forming a pin receiving aperture in said boss, a piston pin carried in said aperture and projecting beyond said boss at the ends thereof, a connecting rod having a piston-connecting end comprising a pair of fork members straddling said pin boss and connected respectively to said projecting end portions of said piston pin, said fork members each having an end wall facing said piston pin and having formed in said end wall a semi-circular recess shaped complementarily to its corresponding end portion of said piston pin and in abutting relation therewith, removable fastening means for connecting said fork members to said piston pin, and a pair of narrow skirts depending from diametrically opposed pheripheral portions of said piston head for providing slipper surfaces at the thrust locations of the piston, wherein said piston pin is tubularly shaped and said removable fastening means for connecting said forked members to said piston pin comprises a pair of threaded bolts extending through said forked members into the interior of said piston pin and a pair of nuts disposed in the interior of said pin and threaded on said bolts, said nuts each having a surface shaped complementary to and abutting the inner cylindrical wall of said piston pin.

4. The piston assembly as defined in claim 1, and including a piston pin rotatably received in said aperture and having a pair of end portions projecting respectively outwardly beyond said pin boss for receiving the piston-connecting end of a connecting rod and bolt means securing said end portions of the pin to the connecting rod in fixed non-rotating relation.

References Cited

UNITED STATES PATENTS

| | | | |
|---|---|---|---|
| 1,789,089 | 1/1931 | Tobler | 92—189 |
| 2,496,094 | 1/1950 | Johnson | 151—41.76 X |
| 2,752,213 | 6/1956 | Swart | 92—187 |
| 2,823,085 | 2/1958 | Keylwert | 92—187 X |
| 2,830,860 | 4/1958 | Sampietro | 92—237 X |
| 3,081,809 | 3/1963 | Rohe | 151—41.76 |
| 2,849,264 | 8/1958 | Ellis et al. | 92—236 X |

FOREIGN PATENTS

| | | |
|---|---|---|
| 176,988 | 2/1906 | Germany. |
| 215,957 | 5/1924 | Great Britain. |
| 686,883 | 4/1930 | France. |
| 1,032,360 | 6/1966 | Great Britain. |

MARTIN P. SCHWADRON, *Primary Examiner.*

G. N. BAUM, *Assistant Examiner.*